United States Patent [19]

Parolisi et al.

[11] Patent Number: 5,060,876
[45] Date of Patent: Oct. 29, 1991

[54] BREAKER PRESS WITH MULTIPLE PISTONS PARTICULARLY FOR URBAN WASTE-MATERIALS

[76] Inventors: Massimo Parolisi, Via Roma N. 229, Frattaminore; Fulvio Di Cerbo, Via Nuova Poggioreale N. 210, Napoli, both of Italy

[21] Appl. No.: 375,182

[22] Filed: Jun. 30, 1989

[30] Foreign Application Priority Data

Jul. 1, 1988 [IT] Italy ................. 40428 A/88

[51] Int. Cl.$^5$ .............................. B02C 1/00
[52] U.S. Cl. .................. 241/263; 241/DIG. 38
[58] Field of Search .......... 241/DIG. 38, 283, 262, 241/263, 264, 164, 95, 84, 270, 271, 272, 273

[56] References Cited

U.S. PATENT DOCUMENTS 4,272,032  6/1981  Hellberg ................. 241/263
4,848,679  7/1989  Blumer ................... 241/263 X Primary Examiner—Mark Rosenbaum

[57] ABSTRACT

The compacting breaker press breaks and compacts waste into small-sized nearly parallelepiped-shaped pieces, which can pass through small-sized pipes for collection. The press includes fixed guides and twin opposing pairs of parallel plates spaced from each other and slidably mounted on the guides. The external plate and internal plate of each pair are movable relative to each other, the internal plate being connected by springs with the external plate. Substantially equal, parallelepiped-shaped pistons are mounted on both external plates and extend through holes in the internal plates. These pistons have flat interior-facing surfaces which lie in two common substantially parallel planes depending on which exterior plate the piston is attached to. Interiorly-directed extractors are attached to both interior plates. Each extractor has the same shape as that of a piston and has an interior-facing surface which lies in one of the two common planes to form two opposing flat continuous surfaces, when the pairs of the plates are separated as far as possible from each other. The press has means for moving the external plates, so that, when these plates are moved toward each other, the inner plates slide toward the external plates on contact with a stop device, the pistons extend from the extractors to form recesses and break the waste and then compact the waste in the recesses into small pieces.

7 Claims, 6 Drawing Sheets

BREAKER PRESS WITH MULTIPLE PISTONS PARTICULARLY FOR URBAN WASTE-MATERIALS

BACKGROUND OF THE INVENTION

The present invention relates to a crusher and/or compacting device for waste materials, particularly house waste materials, and, more particularly, to a breaking and compacting press which breaks, crushes and compacts waste materials into a plurality of small pieces.

Compacting waste or garbage is now performed by presses which collect and press the waste materials together into comparatively large blocks to facilitate their cartage or transport and disposal.

In the case of urban waste materials, this kind of press can be utilized only after the waste materials have been collected from houses and other dwellings and before carting them to dumps and the like. That would necessitate setting up collection centers in buildings, each having a suitable press to reduce the size of the collected materials as much as possible.

However, alternatively the collection of waste materials can be facilitated by compacting them in each house in which they are produced to produce a large number of small sized pieces of waste. These compacted pieces of waste can then be passed through small-sized pipes in the dwelling units to containers. Then the containers with the compacted waste pieces can be transported for disposal. This is considerably more convenient than setting up special waste collection centers.

SUMMARY OF THE INVENTION

Thus, it is an object of the present invention to provide a compacting breaker press, which is installable in individual dwelling units and crushes and breaks up waste materials and then compacts the crushed and broken waste materials into a plurality of small pieces, which can pass through comparatively small sized pipes in the house, apartment or other dwelling unit to containers, which are easily transported after being filled.

According to our invention the compacting breaker press for waste, especially for house-waste materials, comprises means for breaking and compacting the waste into a plurality of small-sized approximately parallelepiped-shaped pieces, so that the pieces can pass through a small-sized pipe for collection and disposal, and frame members of a stationary frame on which the means for breaking and compacting is mounted.

These pieces of compacted waste can be small cubes or other parallelepiped shapes.

The compacting breaker press advantageously has a twin pair of opposing plates slidably mounted on guides, which have a series of small quadrangular pistons and extractors of the same shape and, advantageously, of the same size. The twin pair of opposing plates are moveable toward and away from one another and are provided with means for moving. The internal plate may be moveable with the external plate and/or relative to the external plate. Advantageously the internal plate may be spaced from and connected to the external plate by a spring means comprising a plurality of springs surrounding the stems of the pistons which pass through holes in the internal plate and are secured to the external plate.

The waste materials are place between two flat continuous opposing surfaces formed by the pistons and extractors on the twin pair of opposing plates, when the twin pair of plates are as far apart as possible. Then the twin pair of opposing plates are moved toward one another and the flat opposing surfaces contact the waste material, the internal plates and extractors move toward the external plates, the pistons move into the waste material breaking and crushing it and a plurality of closed recesses are formed between the pistons and extractors in which the waste material which has been crushed and broken is trapped and compacted.

In more detail, the compacting breaker press may contain a plurality of fixed guides and twin opposing pairs of plates, the pairs being spaced from each other and slidably mounted on the fixed guides. Each of the pairs may have an external plate and an internal plate. The external plate and the internal plate of each of the pairs may be moveable toward and away from each other and may be biased by a plurality of springs extending between each other. The compacting breaker further can comprise a plurality of substantially equal, substantially parallelepiped-shaped pistons, the pistons being fixedly connected with both of the external plates and having a flat interior-facing surface, the flat interior-facing surface of each of the pistons lying in one of two common substantially parallel planes, each of the planes being associated with one of the pairs of plates, and a plurality of extractors, the extractors being fixedly attached to both of the internal plates, each of which has the same shape as the pistons and has an interior-facing surface which lies in one of the common planes to form two substantially planar flat continuous surfaces in each of the planes, when the pairs of the plates are separated as far as possible from each other, and means for moving the external plates toward and away from each other on the guides, formed so that, when the waste is placed between the pairs of plates and the pairs are moved toward each other, the inner plates slide toward the external plates, the pistons grind and crush the waste against each other and the waste which has been ground is compacted in a plurality of closed recesses formed between the pistons and the extractors as the extractors slide exteriorly relative to the pistons.

The means for moving may be a double-acting hydraulic cylinder or other hydraulic means.

Advantageously the compacting breaker press also contains a stopping device for both internal plates formed so that the internal plates are stopped while the external plates continue to move so that the pistons carried by the external plates are forced from contact with the extractors on the internal plates. An additional stopping device may be attached to each of the external plates which abuts on the appropriate internal plate halting its advance toward the external plate and limiting the size of the closed recesses in which the crushed waste materials are compacted.

BRIEF DESCRIPTION OF THE DRAWING

The objects, features and advantages of our invention will now be described in detail in the following detailed description, reference being made to the accompanying drawing in which.

DETAILED DESCRIPTION OF THE INVENTION

Figure 1:
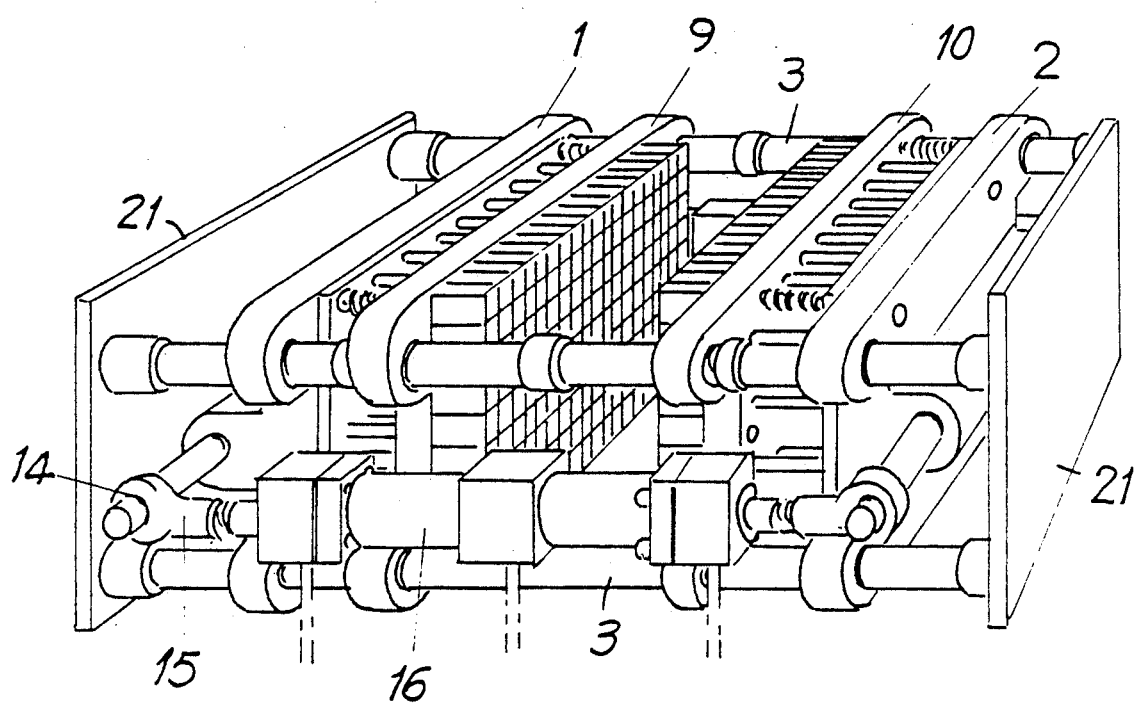
FIG. 1 is a perspective view of a compacting breaker press according to our invention assembled with guides, opposing pairs of plates and hydraulic means for moving the plates relative to each other and together.

One embodiment of the compacting breaker press of the invention is shown in FIGS. 1 to 5. Opposing pairs of approximately parallel plates 1,9 and 2,10 are slidably mounted on the substantially linear, parallel guides 3. These guides 3 are in turn attached between the flat mounting plates 21, which are frame members of a stationary frame for the press. Each external plate 1,2 has a mounting plate 4 attached on its interiorly-facing side having a plurality of holes 4' for attaching and mounting fixed in position a plurality of small pistons 6. Each piston 6 has a substantially flat interiorly-facing surface 6' and an exteriorly directed stem 7. The pistons 6 are secured in place by the screws 5 passing through the mounting plate 4 and engaging in the end of the stems 7.

Figure 2:
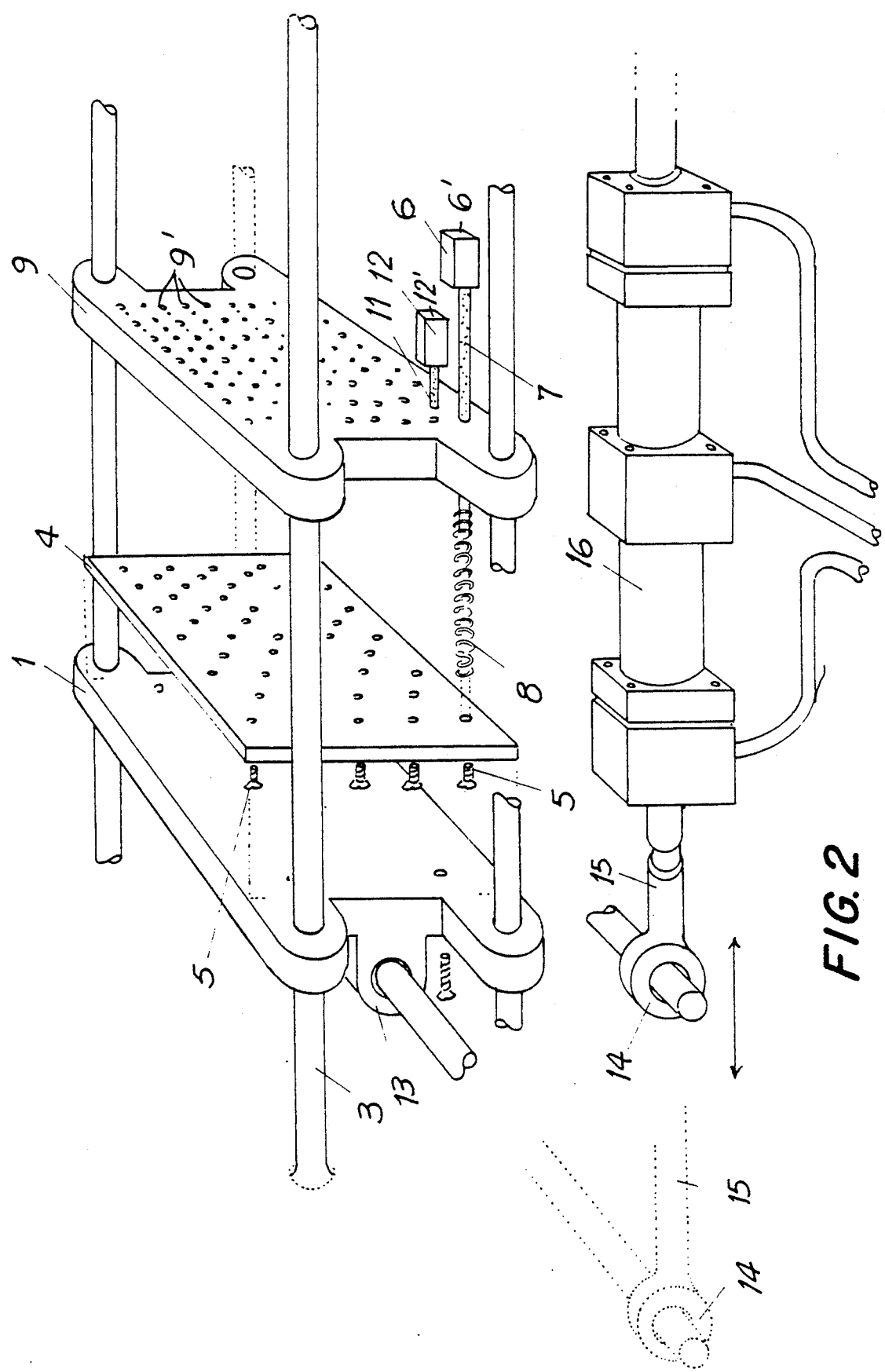
FIG. 2 is an exploded perspective view of one pair of plates of a compacting breaker press and hydraulic means for moving those plates.
Figure 3:
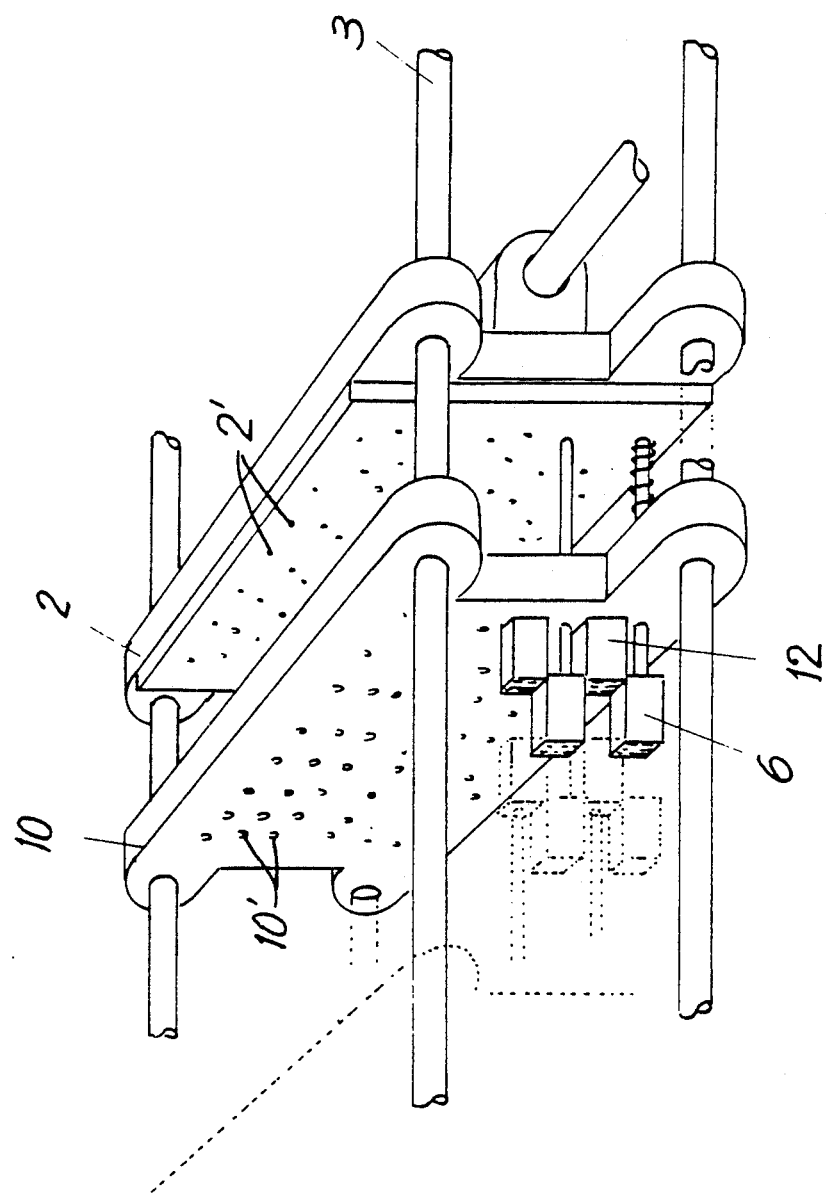
FIG. 3 is an exploded perspective view showing an assembly of a plurality of pistons and an equal number of extractors on the plates of the compacting beaker.

The interior plates 9 and 10 also have a plurality of through-going holes in which the stems 11 of a plurality of interiorly-directed extractors 12 are held in place by screws. As seen in FIG. 2 the stems 7 of the pistons 6 pass through another set of through-going holes 9',10' in the interior plates 9 and 10 but are not attached to the interior plates 9 and 10. In contrast the extractors 12 are rigidly attached to the interior plates 9 and 10, while the pistons 6 are rigidly attached to the exterior plates 1 and 2. The extractors 12 have an interiorly-facing surface 12' which is substantially flat.

All of the pistons 6 and extractors 12 are parallelepiped shaped and of the same size in this embodiment.

The interior plates 1 and 2 are provided with bearings 13 which are connected to the bushes 14 carried by the small piston rods 15, which are engaged in double-acting cylinder 16 and which determine the spacing between the exterior plates 1 and 2. The double-acting cylinder 16 is the means for moving the plates in this embodiment.

Figure 4:
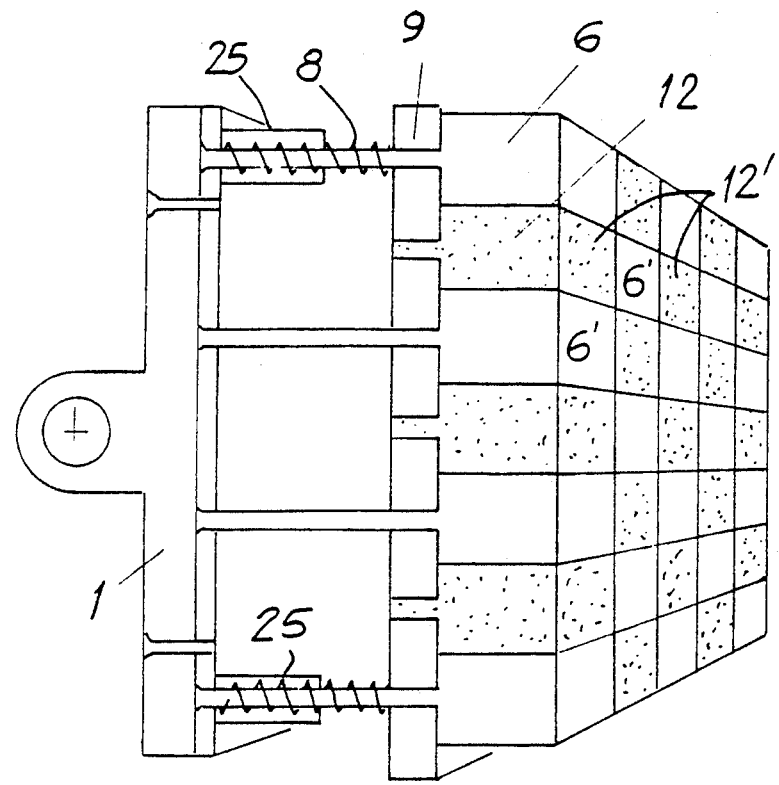
FIGS. 4 and 5 are perspective action views of the plates with pistons and extractors showing the configuration of the pistons and extractors when the pistons move forward.
Figure 5:
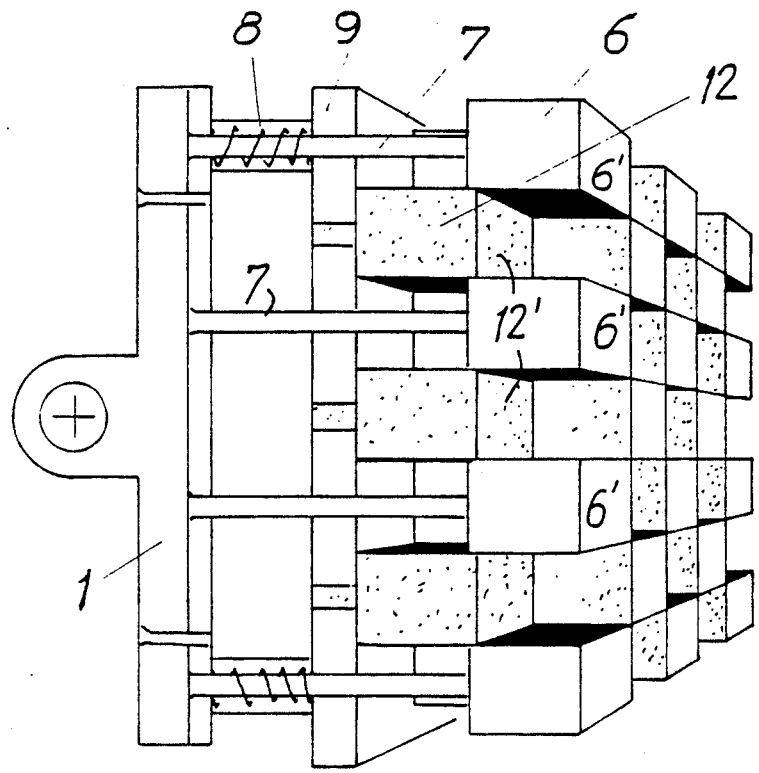

The interior plates 1 and 2 are spaced from and connected to the exterior plates 9 and 10 by the springs 8 which surround the stems 7. These springs 8 comprise a spring means for biasing the interior plates and are slidably mounted on the stems 7. The interior plates 1 and 2 may be pushed toward the exterior plates 9 and 10 as seen in FIGS. 4 and 5.

Figure 6:
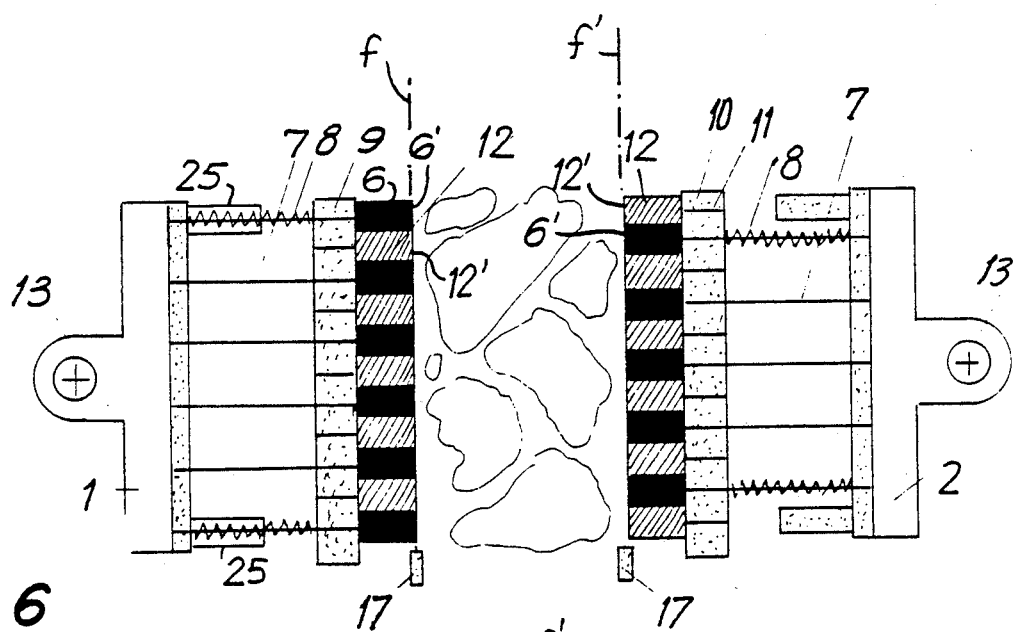
FIGS. 6, 7 and 8 are respectively schematic side action, side action and perspective action views showing the operation of the compacting breaker press during compacting of the crushed and broken up waste products.
Figure 7:
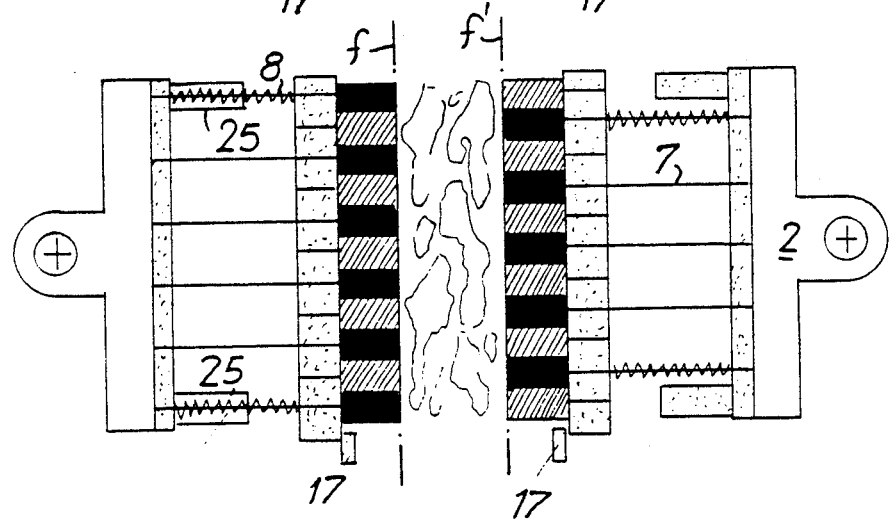
Figure 8:
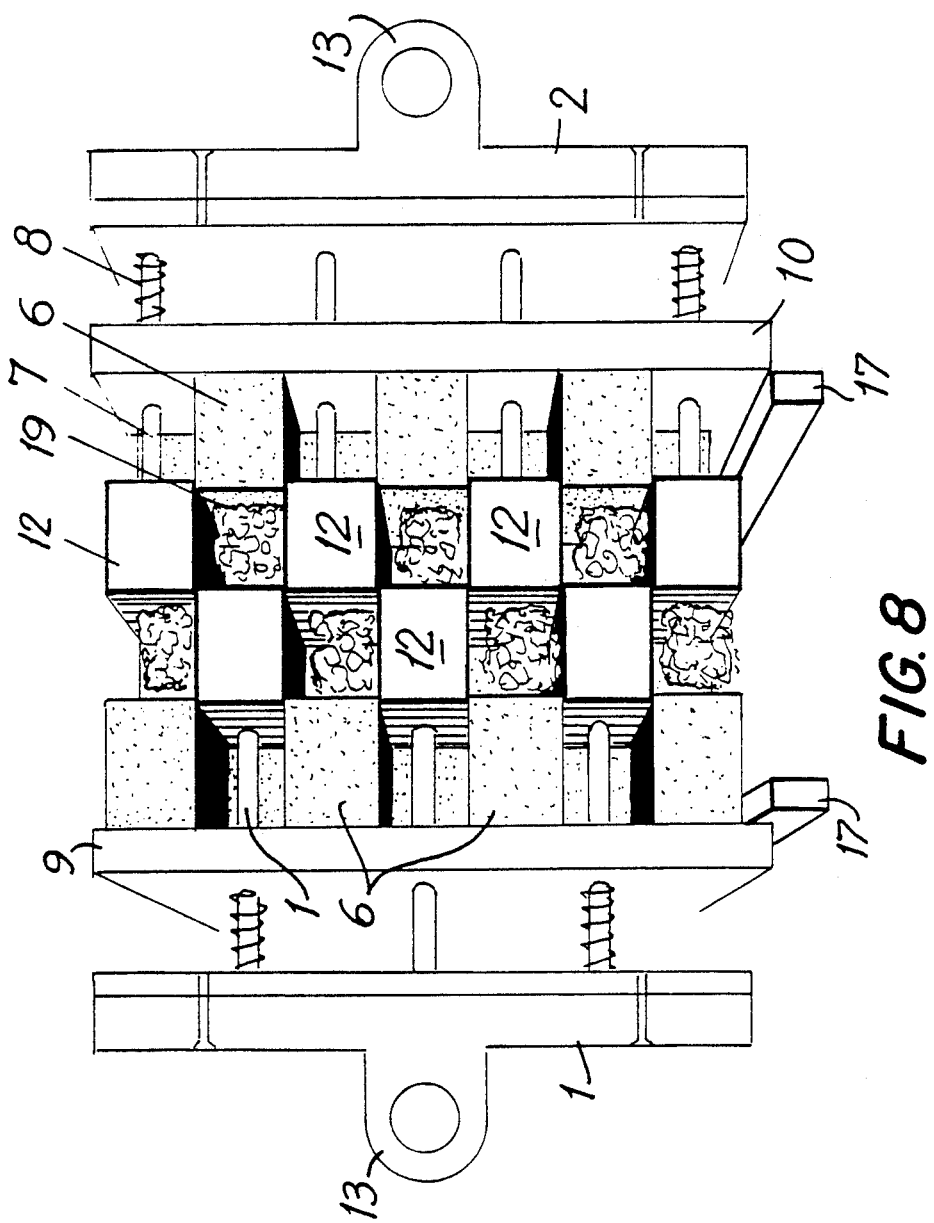

The action of the compacting breaker press on waste materials is shown in the action views, FIGS. 6, 7 and 8.

FIG. 6 shows the beginning of the compression stroke in which the exterior plates 1 and 2 are spaced as far apart as possible with the springs 8 extended and the interior plates 9 and 10 spaced at their maximum distance from the exterior plates 1 and 2. The length of the stems 11 and 7 is such that in this configuration the interiorly-facing surfaces 6' of the pistons and 12' of the extractors all lie in a common flat continuous planar surface f or f'.

FIG. 7 shows an intermediate configuration in which the pairs of plates are approaching each due to the action of the double-acting cylinder 15. In this configuration the waste material has experienced some compression as the flat planar f and f' approach each other until they reach a stopping surfaces device 17, which keeps the interior plates 9 and 10 stationary as the exterior plates 1 and 2 are moved interiorly.

For the configuration of FIG. 7 further inward motion of the exterior plates 1 and 2 due to action of the double-acting cylinder 15 results in compression of the springs 8 and approach of the exterior plates 1 and 2 to the interior plates 9 and 10. Since the stems 7 are rigidly connected with the exterior plates 1 and 2 the pistons move interiorly from the extractors during this inward motion of the exterior plates 1 and 2. In this embodiment this continues until the othe pipe-like stopping devices 25 attached to the exterior plates 1 and 2 arrest the motion of the external plates 1 and 2 by abutting on the interior plates 9 and 10. This is shown in the FIG. 8 in perspective.

Since the pistons 6 on one interior plate are staggered relative to the pistons 6 on the other interior plate (i.e. a piston on one plate, if fully extended, would rest on an extractor 12 on the other plate), in the configuration shown in FIG. 8 a plurality of closed recesses are formed containing compacted waste material which has been crushed and broken by the action of the converging pistons 6. Thus a number of compacted solidified small-sized approximately parallelepiped pieces 19 of the waste material are formed.

When the aotion of the double-aoting cylinder 16 is reversed, the external plates 1 and 2 are moved from each other bringing the pistons 6 again back to the interior plates 9 and 10 and eventually the pairs of plates move back to the starting position. The small pieces 19 then fall from the press.

Because of the structure of this press then a twin advantage is attained. First, the waste material is crushed and broken up into bits and pieces and second the bits and pieces are compacted into small sized compact approximately parallelepipid pieces 19 which can easily pass through suitable pipes in house and other dwelling units to a collection container at the base of the dwelling.

It will be understood that each of the elements described above, or two or more together, may also find a useful application in other types of structures differing from the types described above.

While the invention has been illustrated and described as embodied in a compacting breaker press with multiple pistons, particularly for urban waste, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A compacting breaker press for waste, especially for house-waste materials, comprising means for breaking and compacting said waste into a plurality of small-sized approximately parallelepiped-shaped pieces, so that said pieces can pass through a small-sized pipe for collection, and frame members on which said means for breaking and compacting is mounted, said means for breaking and compacting being structured so as to form a plurality of closed recesses, when said waste is being broken and compacted by said means for breaking and compacting, said waste so broken and compacted being trapped in said closed recesses, and said means for breaking and compacting being further structured so that said waste trapped inside said closed recesses is further compacted.

2. A compacting breaker press for waste, especially for house-waste materials, comprising means for breaking and compacting said waste into a plurality of small-sized approximately parallelepiped-shaped pieces, so that said pieces can pass through a small-sized pipe for collection, and frame members on which said means for breaking and compacting is mounted, said braking and compacting means comprising a plurality of fixed guides; twin opposing pairs of plates, said pairs being spaced from each other and slidably mounted on said fixed guides, each of said pairs having an external plate and an internal plate, said external plate and said internal plate of each of said pairs being moveable toward and away from each other and being connected to each other by a plurality of springs extending between each other; a plurality of substantially equal, substantially parallelepiped-shaped pistons, said pistons being fixedly connected with both of said external plates, extending interiorly through said internal plates and each having a flat interior-facing surface, said flat interior-facing surface of each of said pistons lying in one of two common substantially parallel planes according to which of said exterior plates said piston is connected to; and a plurality of interiorly-directed extractors, said extractors being attached to both of said internal plates, each of said extractors having the same shape as that of said pistons and an interior-facing surface which lies in one of said common planes to form two substantially flat continuous surfaces in each of said planes, when said pairs of said plates are separated as far as possible from each other, and means for moving said external plates toward and away from each other on said guides, so that, when said waste is placed between said pairs of plates and said pairs are moved toward each other, said inner plates move toward said external plates, said pistons grind and crush said waste and said waste which has been ground is compacted in a plurality of closed recesses formed between said pistons and said extractors as said extractors slide exteriorly relative to said pistons.

3. A compacting breaker press according to claim 2, wherein said means for moving said external plates toward each other comprises a double-acting cylinder, which also effects motion of said external plates relative to said internal plates.

4. A compacting breaker press according to claim 2, wherein said means for moving is hydraulic.

5. A compacting breaker press according to claim 2 further comprising a stopping device for said internal plates formed so that said internal plates are stopped while said external plates continue to move so that said pistons carried by said external plates are forced from contact with said internal plates.

6. A compacting breaker press according to claim 2, further comprising another stopping device attached to said external plates which abuts on said internal plates halting the advance of said external plates.

7. A compacting breaker press for waste, especially for house-waste materials, comprising means for breaking and compacting said waste into a plurality of small-sized approximately parallelepiped-shaped pieces, so that said pieces can pass through a small-sized pipe for collection, and frame members on which said means for breaking and compacting is mounted, said means for breaking and compacting said waste having an interior and an exterior and comprising:

a plurality of substantially linear, parallel guides attached to said frame members;

twin opposing pairs of nearly parallel plates slidably mounted and spaced from each other on said guides so as to be moveable toward and away from each other, each of said pairs including an internal plate and an external plate separately slidably mounted substantially parallel to each other on said guides so as to be moveable relative to each other and with each other, each of said inner plates having a plurality of through-going holes therein, one plurality of parallelepiped-shaped pistons, each of said pistons being rigidly attached to one of said external plates of one of said pairs by a stem, each of said stems passing through one of said through-going holes of said inner plate of said pair, each of said pistons having a substantially flat interior-facing surface lying in one common plate substantially parallel with said external plate, another plurality of parallelepiped-shaped pistons, each of said pistons being rigidly attached to the other of said external plates of the other of said pairs by a stem, each of said stems passing through one of said through-going holes of said interior plate of said of the repair, each of said pistons of said other plurality having a substantially flat interior-facing surface lying in another common plane substantially parallel with said external plate and said inner plate of said other pair, spring means for each of said pairs of plates, said spring means including a plurality of springs, each of which is mounted on one of said stems connecting and spacing said inner plate from said external plate of said pairs, one plurality of interiorly-directed extractors, each of said extractors being rigidly attached to one of said inner plates and being substantially parallelepiped shaped, each of said extractors having a substantially flat interior-facing surface lying in said one common plane of said interior surfaces of said pistons and fitting between said pistons, when said twin pairs of plates are spaced as far apart as possible, another plurality of interiorly-directed extractors, each of which being rigidly attached to the other of said inner plates and being substantially parallelepiped shaped, each of said extractors having a substantially flat interior-facing surface lying in said other common plane of said interior surfaces of said pistons and fitting between said pistons to form a flat planar surface without recesses in said other common plane, when said twin pairs of plates are spaced as far apart as possible, and means for moving one of said pairs of plates toward and away from the other of said pairs of plates on said guides, so that, when said waste is placed between said pairs of plates and said pairs are moved toward each other, said inner plates slide toward said external plates, said one plurality of pistons grind and crush said waste while being moved toward said other plurality of pistons and said waste which has been ground is compacted in closed recesses formed between said pistons and said extractors as said extractors slide by said pistons.

* * * * *